Oct. 21, 1941.   L. D. JENNINGS ET AL   2,260,142
DEMOLITION BOMB
Filed June 30, 1939   3 Sheets-Sheet 1

Fig. 1.

1st Operation: Plane both sides preparatory for inside weld.

Fig. 2.

Fig. 3. 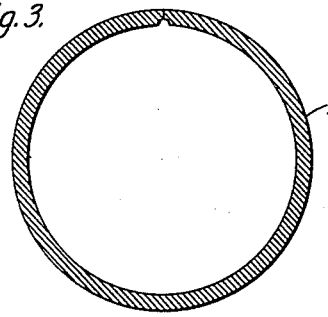   Fig. 4. 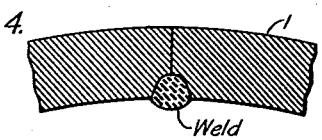

2nd Operation: Sheet rolled ready for Welding.

3rd Operation: Longitudinal seam welded.

Fig. 5. 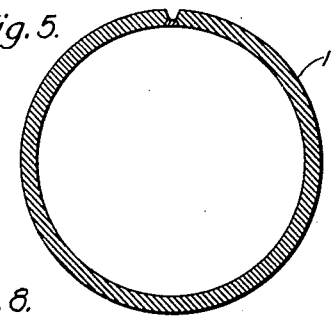   Fig. 6. 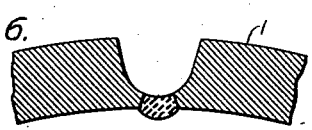

4th Operation: Cylinder milled for Welding.

Fig. 7. 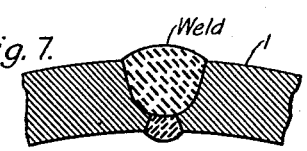

5th Operation: Cylinder is Welded on the outside seam.

Fig. 8.
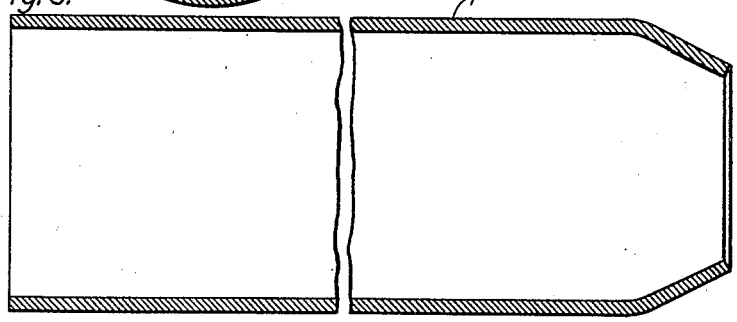

6th Operation: Swage End Cold to a small taper.

7th Operation: Both ends machined for welding nose and rear ends.

Fig. 9.
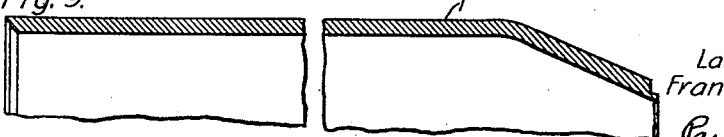

INVENTORS
Lawrence D. Jennings,
Frank J. Ramik & Harry E. Criner
BY
Paul E. Friedemann
ATTORNEY

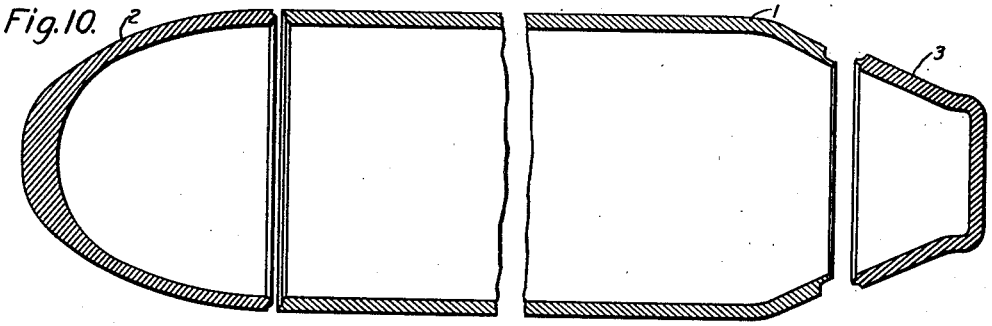
8th Operation: Form Nose and Rear End and Assemble.
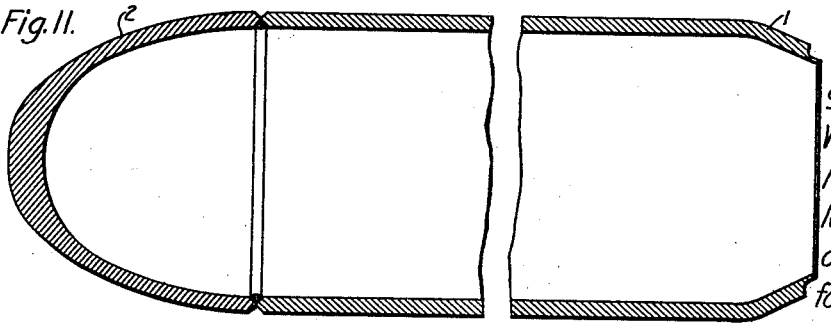
9th Operation: Weld inside of Nose and Machine Nose on outside for Welding.
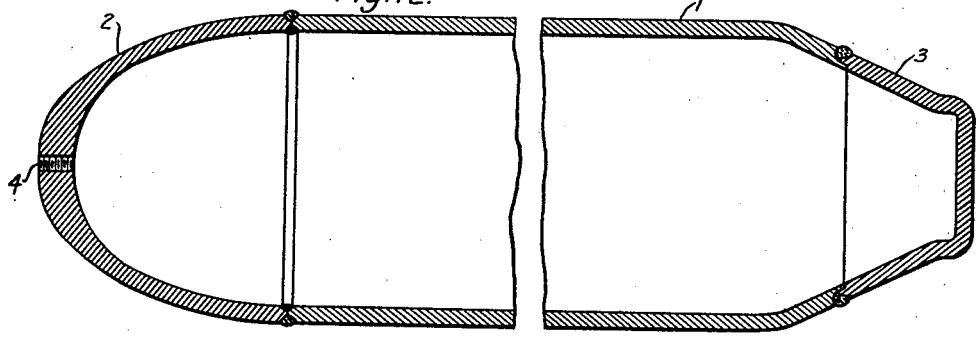
10th Operation: Form Rear End and Weld both Nose and Rear End.
11th Operation: Anneal
12th Operation: Autofrettage Oct. 21, 1941.   L. D. JENNINGS ET AL   2,260,142
DEMOLITION BOMB
Filed June 30, 1939   3 Sheets-Sheet 3

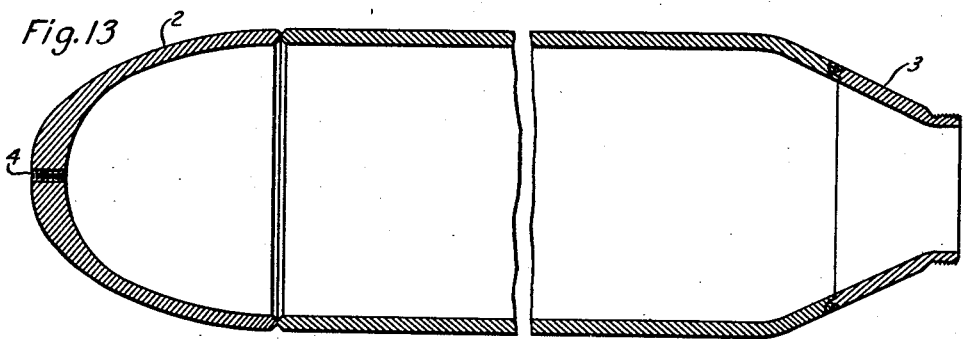

Fig. 13

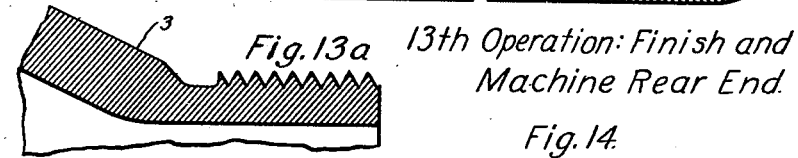

Fig. 13a  13th Operation: Finish and Machine Rear End.

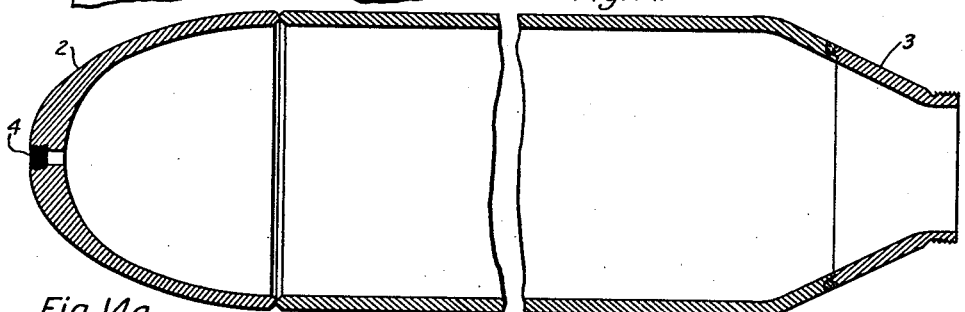

Fig. 14

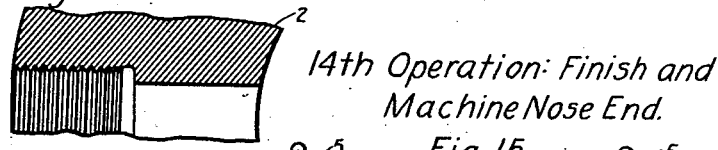

Fig. 14a.  14th Operation: Finish and Machine Nose End.

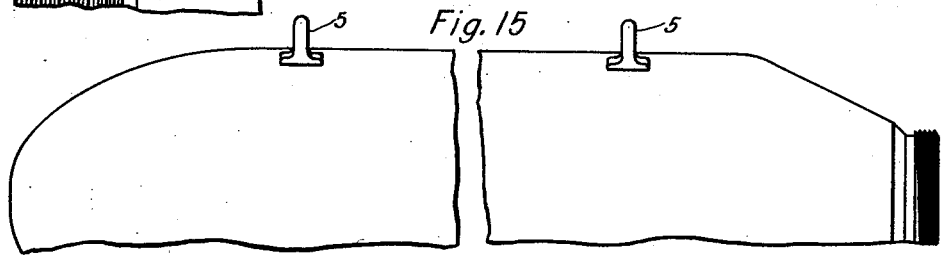

Fig. 15

15th Operation: Assemble and weld Suspension Lugs.
16th Operation: Test Lug.
17th Operation: Shot Blast.
18th Operation: Paint Inside.
19th Operation: Assemble Bomb Rear Cap, Finish Lock Nut and Rear Plug.
20th Operation: Paint, Assembly Complete and Stencil.

INVENTORS
Lawrence D. Jennings,
Frank J. Ramik & Harry E. Criner
BY
Paul E. Friedeman
ATTORNEY Patented Oct. 21, 1941

2,260,142

UNITED STATES PATENT OFFICE 2,260,142

DEMOLITION BOMB

Lawrence D. Jennings, Frank J. Ramik, and Harry E. Criner, Wilkinsburg, Pa., assignors to Westinghouse Electric & Manufacturing Company, East Pittsburgh, Pa., a corporation of Pennsylvania Application June 30, 1939, Serial No. 282,186

5 Claims. (Cl. 29—1.21)

Our invention relates to an improved hollow projectile or shell useful in the construction of a demolition bomb and is particularly directed to a novel method of making the hollow projectile or shell.

An object of our invention is to construct a hollow projectile or shell which has rigid, airtight walls having high bursting qualities.

Another object of our invention is to provide a method for fabricating a hollow projectile or shell, which method is relatively simple and inexpensive but which is effective to produce a hollow projectile or shell having a maximum number of desirable qualities.

Other objects and advantages will become more apparent from a study of the following specification when considered in conjunction with the accompanying drawings, in which:

Figures 1 to 15, inclusive (together with Figs. 13a and 14a) show, progressively, the various steps in the process of making a hollow projectile or shell. Suitable legends are appended to the figures to indicate the particular step of the process. A complete description of each of the figures and of the progressive steps in the manufacture of a hollow projectile or shell is as follows:

Fig. 1 shows a flat plate 1 of a suitable metal such as manganese vanadium steel. One desirable composition of such steel is as follows: C, 0.20%; Mn, 1.41%; Si, 0.20%; P, 0.013%; S, 0.027%; V, 0.10%. It is understood, of course, that other compositions of manganese-vanadium steel or of other suitable metals may also be used. Flat plate 1 is selected so as to have its long crystal structure oriented in the direction left to right (or right to left) of Fig. 1. This may be originally accomplished by rolling the ingot used in the forming of the flat plate 1 in such direction. Plate 1 is then sheared to a length corresponding to the desired circumference of the shell and is planed on both sides and prepared for an inside weld in the manner shown in Fig. 2. Plate 1 is then cold rolled into cylindrical form as shown in Fig. 3. It will thus be seen that the direction of rolling has been so chosen that the long axes of the crystals or grain structure of the metal remain oriented in a circumferential direction. This arrangement of the crystals with their long axes in a circumferential direction greatly enhances the fragmentation or bursting qualities of the shell. The cold-rolling process is found to be more satisfactory than the hot rolled process because of its simplicity and because it imparts greater tensile strength to the metal. It is then welded along its internal longitudinal seam as shown in Fig. 4.

An alternative method to that illustrated in Figs. 1 to 4 is that by which no cutting of the plate at each side is made. Thus if the plate were rolled as shown in Fig. 3, no longitudinal seam for the weld would be formed. To avoid this situation, the cylinder is not completely closed, that is, a small gap, say about one-eighth inch, is left behind the ends of the plate, then the ends are tacked, that is, they are provided with a plurality of separate welds externally along the gap merely for the purpose of holding the plate in cylindrical form. Afterwards an internal weld is made along the entire length of the open gap, thereby closing the cylinder.

After the internal longitudinal seam weld is made, the cylinder is milled along an external longitudinal seam until the internal weld is reached as shown in Fig. 6, thereby preparing it for an external longitudinal weld which is made in the manner shown in Fig. 7. The cylinder or barrel is then provided with a tapered or frusto-conical end portion as shown in Fig. 8. The desirable method of forming this taper is by a cold swaging process. Any suitable device for cold swaging may be used, such as a hydraulic press which operates cylindrical or other suitably shaped forming dies. Although only one end is shown as being tapered by the cold swaging process, it is understood, of course, that both ends may be tapered if desired. The cold swaging process is found to be much more desirable than the hot swaging process normally used in the art, inasmuch as it is simpler and is effective to produce a barrel having greater tensile strength.

After the cold swaging process, the ends of the cylinder are machined to prepare them for welding as shown in Fig. 9. Fig. 10 is an exploded view showing not only the cylindrical or barrel 1 portion of the projectile but showing the nose 2 and tail 3, the latter two being machined in a manner so as to provide suitable seams for welding when the parts are assembled.

The nose 2 and tail 3 may be formed by any suitable methods. For example, the nose 2 may be formed by hot forging a thick disc-shaped blank and "normalizing" the same (that is, heating it to about 1700° F. then cooling it rapidly in air). The tail 3 may be formed from a disc-shaped blank by a cold drawing process by the use of a suitable press. The blank is drawn cold into a hemispherical shape and is then heated to about 850° C. and hot pressed to a desirable size and contour. It is then cut to length and machined suitably to prepare it for the welding process as described.

The nose 2 and barrel or cylinder 1 are then assembled, then held in place by any suitable assembly fixture and welded internally along a circumferential seam in the manner shown in Fig. 11. The tail 3 is then welded to the tapered end portion of the barrel along an external longitudinal seam as shown in Fig. 12. The nose 2 is likewise welded along an external circumferential seam as shown in Fig. 12.

The assembly is then annealed by subjecting it to a temperature of about 1150° F. for a period of about one and one-half hours in order to relieve it of stresses, such as those developed in the cold working process. The heating should be gradual and should require at least two and three-fourths hours for the attainment of the 1150° F. temperature. The cooling should be partially done in the furnace.

The next operation is that sometimes referred to as "autofrettaging," that is, to impart a permanent change inside of the assembly while it is cold, thereby setting up suitably positioned stresses therein which are desirable for the purpose of improving the bursting quality of the shell. The "autofrettaging" is carried on as follows: The assembly is placed in a suitable restraining cylinder (not shown). A tap 4 is made in the nose (see Fig. 12) and a fluid, for example, water, is introduced therein by a pipe or any other suitable means. Then, by a hydraulic pump, the water is subjected to a very high pressure (for example, 4000 pounds per square inch), which pressure is sufficient to cause a small expansion (about 1% of the diameter) of the entire shell. After a predetermined time the shell permanently holds its expanded shape, that is, it is permanently set. In this condition compressive stresses are retained along the inner surface of the shell while tensile stresses are retained along the external surface thereof, thereby substantially enhancing the bursting qualities of the shell, that is, adapting it to break into a larger number of fragments. During the "autofrettaging" process, the shell is also tested for leaks, that is, when the water under high pressure is in the shell, leaks will be readily detected by the presence of water along the external surface of the shell. It will be noted that the entire shell wall is integrally formed for the "autofrettaging" process and no screw threaded connections are present. This is highly advantageous since it eliminates the necessity of gaskets to make the screw threaded connection fluid tight and since it shortens the necessary time for testing. Furthermore, also since it avoids the danger of change in thread dimensions due to the expanding of the shell during the "autofrettaging" process.

After the "autofrettaging" process is completed and the restraining cylinder and the liquid are removed, the bottom portion of the tail 3 is cut away and the end portion remaining is bored, machined and threaded in the manner shown in Fig. 13. Fig. 13a is an enlarged partial view of the threaded end portion in Fig. 13. The tap 4 in the nose end is then bored, tapped and faced in the manner shown in Fig. 14 and Fig. 14a (the latter figure showing an enlarged partial view of the threaded nose portion in Fig. 14).

Suspension lugs 5 are then welded on the upper portion of the shell assembly, as shown in Fig. 15. These lugs are then tested by entering a predetermined pull or tension thereon by any suitable means such as a hydraulic tester. The assembly is then shot blast and painted. A lock nut and a screw threaded rear plug (not shown) are provided on the screw threaded end of tail 3 to close the shell. Likewise a threaded plug (not shown) is provided on the threaded portion of nose 2. The assembly is then completed and suitably stenciled. It is now ready to be loaded with a charge of explosive which is introduced through the screw threaded plug on tail 3.

Although the above described process has been directed to the making of a projectile or shell, it will be readily apparent that it may also be used in the fabrication of tanks or other similar enclosed structures.

We are, of course, aware that others, particularly after having had the benefit of the teachings of our invention, may devise other devices embodying our invention and we, therefore, do not wish to be limited to the specific showing made in the drawings and the descriptive disclosure hereinbefore made, but wish to be limited only by the scope of the appended claims and such prior art that may be pertinent.

We claim as our invention:

1. The method of making a hollow metallic projectile or shell which includes welding a plurality of separate portions to form the complete shell wall, introducing a fluid at substantially high pressure within the walls of said shell so as to effect a small expansion or permanent set to said shell and thereafter exhausting said shell of said fluid.

2. The method of making a hollow metallic projectile or shell which includes providing a nose portion and a tail portion, each being substantially cup-shaped, and a substantially cylindrical portion, welding all of said portions together so as to form the complete shell wall, introducing a liquid within said shell at a substantially high pressure so as to effect a permanent expansion or setting of said wall, and thereafter withdrawing said liquid.

3. The method of making a hollow metallic projectile or shell which includes providing a cylindrical portion which has integral therewith a nose portion, providing a substantially cup-shaped tail portion which is free from perforations, welding said tail portion to said cylindrical portion, introducing a fluid at high pressure within the completed shell wall to provide a small permanent expansion or set to said shell wall, and cutting off the bottom of said tail portion.

4. The method of making a hollow metallic projectile or shell which includes providing a cylindrical portion which has integral therewith a nose portion, providing a substantially cup-shaped tail portion which is free from perforations, welding said tail portion to said cylindrical portion, introducing a fluid at high pressure within the completed shell wall to provide a small permanent expansion or set to said shell wall, cutting off the bottom of said tail portion, and threading said tail portion thereby adapting it to receive a screw threaded closure or bottom portion.

5. The method of making a hollow metallic projectile or shell which includes providing a nose portion and a tail portion, each being substantially cup-shaped, and a substantially cylindrical portion, welding all of said portions together so as to form the complete shell wall, annealing said shell, introducing a liquid within said shell at a substantially high pressure so as to effect a permanent expansion or setting of said wall, and thereafter withdrawing said liquid.

LAWRENCE D. JENNINGS.
FRANK J. RAMIK.
HARRY E. CRINER.